(12) United States Patent
Vauchel et al.

(10) Patent No.: US 8,677,732 B2
(45) Date of Patent: Mar. 25, 2014

(54) THRUST REVERSER WITH GRIDS FOR JET ENGINE

(75) Inventors: Guy Bernard Vauchel, Le Havre (FR); Pierre Andre Marcel Baudu, Criquetot l'Esneval (FR)

(73) Assignee: Aircelle, Gonfreville l'Orcher (FR)

( * ) Notice: Subject to any disclaimer, the term of this patent is extended or adjusted under 35 U.S.C. 154(b) by 1094 days.

(21) Appl. No.: 12/446,704

(22) PCT Filed: Sep. 26, 2007

(86) PCT No.: PCT/FR2007/001574
§ 371 (c)(1),
(2), (4) Date: Jan. 27, 2010

(87) PCT Pub. No.: WO2008/049986
PCT Pub. Date: May 2, 2008

(65) Prior Publication Data
US 2010/0139242 A1    Jun. 10, 2010

(30) Foreign Application Priority Data
Oct. 23, 2006    (FR) .................................... 06 09265

(51) Int. Cl.
*F02K 3/02*    (2006.01)
(52) U.S. Cl.
USPC ........................................ 60/226.2; 60/226.1
(58) Field of Classification Search
USPC .................... 60/226.1–226.3, 262, 230, 798; 239/265.29, 265.31, 265.37; 244/110 B
See application file for complete search history.

(56) References Cited

U.S. PATENT DOCUMENTS

| 3,262,268 A | 7/1966 | Beavers |
| 3,280,562 A | 10/1966 | Theits et al. |
| 3,511,055 A | 5/1970 | Timms |
| 4,005,822 A | 2/1977 | Timms |
| 4,909,442 A | 3/1990 | Fernz |
| 4,922,713 A * | 5/1990 | Barbarin et al. ............. 60/226.2 |

FOREIGN PATENT DOCUMENTS

GB    2 045 179    10/1980

OTHER PUBLICATIONS

International Search Report; PCT/FR2007/001574; Apr. 4, 2008.

* cited by examiner

*Primary Examiner* — Phutthiwat Wongwian
*Assistant Examiner* — Vikansha Dwivedi
(74) *Attorney, Agent, or Firm* — Brinks Gilson & Lione

(57) ABSTRACT

The invention relates to a thrust reverser (1) comprising an opening with fixed grids (4) that is closed by a sliding lid (2) in case of direct thrust, and opened by the downstream longitudinal translation displacement of the lid (2) in case of thrust reversal. A flap (20) is pivotally mounted at one upstream end on the lid (2) and can move between a retracted position and an expanded position in which, in case of thrust reversal, it blocks an annular channel (10) in order to redirect a gas flow towards the grid opening (4). A slider (24) for driving the flap (20) is mounted so as to be capable of displacement in at least one translation guiding rail (33) provided in the structure of the lid (2), and is connected to a downstream end of the flap (20) through a driving connecting rod (30) so that a translation movement of the slider (24) in the guiding rail (33) results in a pivoting of the connecting rod (30) and of the flap (20). Actuation means (22) are provided for driving the slider (24) in a translation movement in the guiding rail (33) when the lid (2) is in a downstream translation phase.

12 Claims, 6 Drawing Sheets

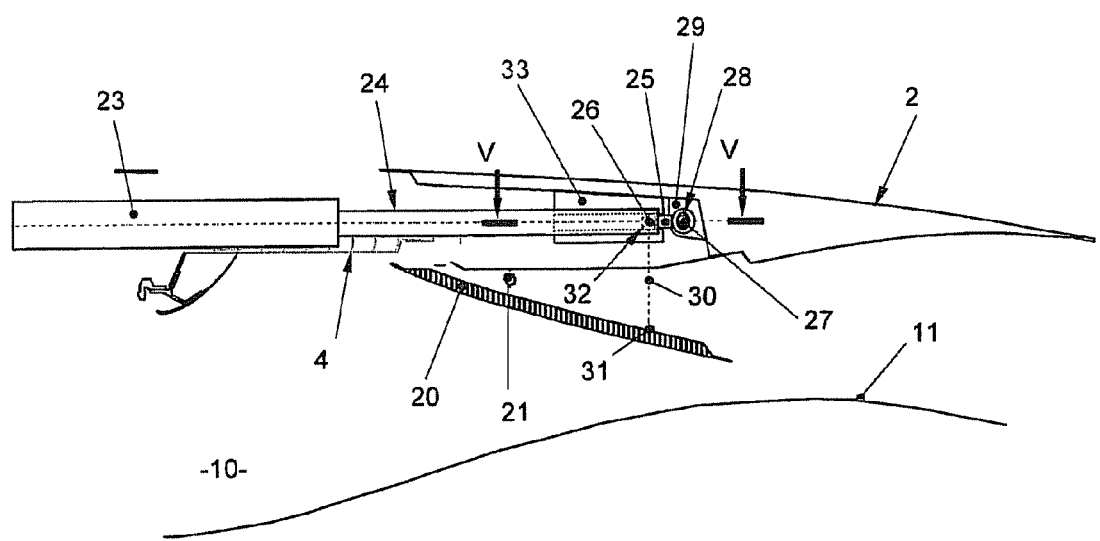
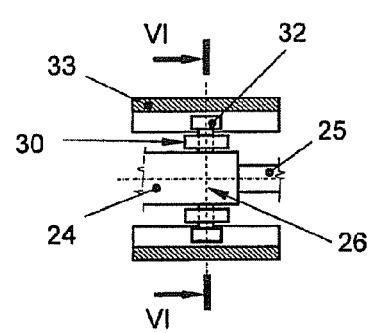 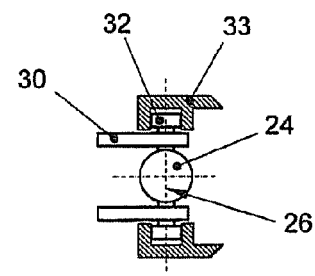
FIG.4
FIG.5　　　　FIG.6

THRUST REVERSER WITH GRIDS FOR JET ENGINE

FIELD OF THE INVENTION

The invention relates to a thrust reverser, known as a grid-type or cascade-type thrust reverser, for a jet engine.

BACKGROUND OF THE INVENTION

An aircraft is moved by a number of jet engines each housed in a nacelle which also accommodates a set of auxiliary actuating devices which are associated with the operation of said aircraft and which perform various functions when the jet engine is operating or at a standstill. These auxiliary actuating devices particularly comprise a mechanical thrust reversal system.

A nacelle generally has a tubular structure comprising an air inlet upstream of the jet engine, a mid-section intended to surround a fan of the jet engine, and a downstream section accommodating the thrust reversal means and intended to surround the combustion chamber of the jet engine, and is generally terminated by an exhaust nozzle whose outlet is situated downstream of the jet engine.

Modern nacelles are intended to accommodate a bypass jet engine, or turbofan, which is capable of generating, via the rotating blades of the fan, a hot airflow (also termed primary flow) emanating from the combustion chamber of the turbofan, and a cold airflow (secondary flow) which flows outside the turbofan through an annular passage, also termed duct, formed between a cowling of the turbofan and an internal wall of the nacelle. The two airflows are expelled from the turbofan through the rear of the nacelle.

The job of a thrust reverser is to improve the braking capability of an aircraft while it is landing by forwardly redirecting at least a fraction of the thrust generated by the turbofan. In this phase, the reverser obstructs the duct for the cold flow and directs this cold flow toward the front of the nacelle, thereby generating a counter-thrust which combines with the braking of the aircraft wheels.

The means employed to achieve this reorientation of the cold flow vary according to the type of reverser. However, in all cases, the structure of a reverser comprises movable cowls which can be shifted between, on the one hand, a deployed position in which they open in the nacelle a passage intended for the deflected flow, and, on the other hand, a stowed position in which they close this passage. These cowls can perform a deflection function or simply a function of activating other deflection means.

In the case of a grid-type reverser, also known by the name of a cascade-type reverser, the airflow is reoriented by deflection grids, the cowl having only a simple sliding function with the aim of uncovering or covering these grids. Complementary blocker doors, also termed flaps, activated by the sliding movement of the cowling, generally make it possible to close off the duct downstream of the grids so as to optimize the reorientation of the cold flow.

These flaps are pivotally mounted, by an upstream end, to the sliding cowl between a refracted position, in which, together with said movable cowl, they provide aerodynamic continuity of the internal wall of the nacelle, and a deployed position in which, in a thrust reversal situation, they at least partially block off the annular duct in order to deflect a gas flow toward the deflection grids uncovered by the sliding movement of the movable cowl. The pivoting movement of the flaps is guided by means of links which are attached, on the one hand, to the flap and, on the other hand, to a fixed point of the internal structure defining the annular duct.

A first problem with such a configuration concerns the kinetics of the degree of opening of the flaps which, at the start of the opening phase of the movable cowls, is quicker than the opening of said cowl. The consequence of this is that, at the start of the opening phase of the movable cowls, the passage section across the nacelle is smaller than the section of the duct which is blocked by the flaps. This results in an increase in the pressure in the engine, thereby entailing difficult management of the turbofan speed in this transient phase.

A second problem concerns the guide links passing through the duct and thereby causing numerous aerodynamic disturbances in the secondary flow.

Fastening the links to the internal structure constitutes a third problem. Specifically, the installation of fixed hinge points reduces the area of the internal structure that can be used for acoustically treating said internal structure.

Finally, a fourth problem concerns the fact that the thrust reverser structure is mechanically connected by the links to the internal structure. As a result, the thrust reverser structure and the internal structure are not independent of one another, thus complicating their removal when maintenance operations on the nacelle or the turbofan make this necessary. It should be pointed out that this problem more particularly concerns internal structures of the so-called "O-duct" type, that is to say produced from a single piece completely surrounding the turbofan, as opposed to the structures of the "C-duct" type comprising two half-portions joined together around the turbofan.

A number of solutions have been adopted to solve one or more of these problems.

Document U.S. Pat. No. 3,262,268, for example, describes such a grid-type thrust reverser in which a linkage for controlling the pivoting movement of the flap comprises two "scissors" levers, one lever of which is hinged on the sliding cowl and the other lever of which, which is more downstream, is hinged on guide beams belonging to the external nacelle.

This solution avoids the use of connecting links between the flap and the internal structure.

However, the scissors-type linkage, which is simple and lightweight, has the disadvantage of deploying the flap very quickly in the annular duct at the start of the retreating travel of the sliding cowl, and therefore does not solve the problem of the difference in opening kinetics between the movable cowl and the flaps.

Document U.S. Pat. No. 4,005,822 also describes such a thrust reverser in which the flaps are pivotally mounted on the movable cowl and attached to a link mounted on the actuating means of the movable cowl in such a way that, once the actuating means are at the end of their travel, they cause the link to retreat, thus pivoting the flap in the process.

Such a system allows a delayed opening of the flaps with respect to the opening of the movable cowl, thus preventing an increase in pressure in the duct. However, the converse disadvantage arises, since the passage section across the nacelle, added to those of the two flows in direct jet mode, is too large with respect to the air inlet section of the nacelle. Such a situation is also prejudicial to the turbofan.

It will also be noted that the grids are integrated with a movable ring section which is moved together with the movable cowl, said ring section being a bulky element and having an impact on the mass of the nacelle assembly. The presence of this movable ring section also requires dedicated guide elements which have an impact on the mass of the assembly and complicate the use of the system.

Finally, it will be noted that the screw used to drive the flaps is directly exposed to the aerodynamic pressure forces exerted on the flaps, with the risk of a resulting deformation which is incompatible with the reliability required for such a system.

Finally, mention will be made of document U.S. Pat. No. 4,909,442 which provides a complex drive system by means of hydraulic or pneumatic cylinders attached to the movable cowl and to the flap using a set of communicating vessels.

BRIEF SUMMARY OF THE INVENTION

The present invention aims to avoid these disadvantages while maintaining the simplicity and lightness of the means used to drive the flap, and accordingly consists of a thrust reverser for a jet engine, as set forth in the introduction, wherein furthermore a slider for driving the flap is movably mounted in at least one translation-guiding track formed in a structure of the sliding cowl, and is connected to a downstream end of the flap via a driving link such that a translational movement of the slider in its guide track is accompanied by a pivoting of the link, and therefore of the flap, and wherein actuating means are provided for translationally driving the slider in its guide track when the sliding cowl is in a translation phase in the downstream direction.

The invention thus provides a thrust reverser having fixed grids, without connecting links liable to form obstacles in the annular duct, and wherein an operation to deploy the flaps during thrust reversal can be tailored to the deployment of the sliding cowl so as to provide a total exhaust section which is always sufficient with respect to the air inlet section. The operation to deploy the flaps may in particular be substantially delayed until the sliding cowl has retreated by a predetermined distance, that is to say when the movable cowl is in a terminal phase of its translational travel in the downstream direction.

The load on the flaps due to the aerodynamic forces thereon is supported, via the driving links and sliders, by the translation-guiding tracks for the latter.

A better thrust reversal efficiency is easily obtained by adapting the length of the driving link and the position of its hinge on the downstream end of the flap so as to regulate the blocking of the annular duct by the flap.

In one embodiment, the driving slider forms an intermediate movable portion of an actuating cylinder arranged along a longitudinal axis of the reverser, which actuating cylinder comprises a tubular base which is connected to the external nacelle upstream of the reverser and which houses the driving slider together with a terminal rod, both of them being mounted, independently of one another, in an axially sliding manner in the base of the cylinder, a downstream end of the terminal rod being connected to the sliding cowl. Thus, the sliding cowl and the flap have a common actuating cylinder.

In this context, there are, for example, two tracks for translationally guiding the driving slider, which are arranged one on either side of the driving slider, each of these tracks receiving one end, preferably provided with a runner or roller, of a transverse hinge pin for hinging the driving link on the driving slider.

The end of the terminal rod of the actuating cylinder can be connected to the sliding cowl via a transverse driving pin housed in a cavity of oblong shape perpendicularly to the direction of travel of the cowl, said cavity being formed in a structure of the sliding cowl.

In another embodiment, the track for translationally guiding the driving slider extends lengthwise in a transverse plane of the sliding cowl and forms a circular arc substantially concentric with the circumference of the sliding cowl, and said driving link is hinged on the flap and on the driving slider about pins which are substantially parallel to a longitudinal axis of the reverser.

Here, the sliding cowl and the flap thus have separate actuating means.

In this context, the driving slider can advantageously be connected to a plurality of flaps distributed over the circumference of the sliding cowl.

According to one possibility, the driving slider has a length portion provided with a set of teeth intended to engage with a pinion which is driven to rotate, in a transverse plane of the sliding cowl, by an actuator. This actuator is, for example, electric and energized when the sliding cowl reaches a terminal phase of its translational travel in the downstream direction.

According to another possibility, an actuating cylinder for the driving slider, arranged parallel to the guide track for the slider, is hinged by a first end on a structure of the sliding cowl and by a second end on the driving slider.

The sliding cowl can comprise a plurality of flaps distributed over its circumference and each comprising driving links of different lengths in order to generate vortex effects for improving the drag at the outlet of the opening provided with grids.

The present invention also relates to a turbofan nacelle, characterized in that it comprises at least one thrust reverser as described above.

BRIEF DESCRIPTION OF THE DRAWINGS

Other advantages and features of the invention will become apparent on reading the description given below by way of example and with reference to the appended drawings, in which:

FIG. 4 is a similar view to FIGS. 2 and 3 in a thrust reversal situation;

FIG. 5 is a view in section on line V-V in FIG. 4;

FIG. 6 is a view in section on line VI-VI in FIG. 5;

DETAILED DESCRIPTION OF THE INVENTION

Figure 1:
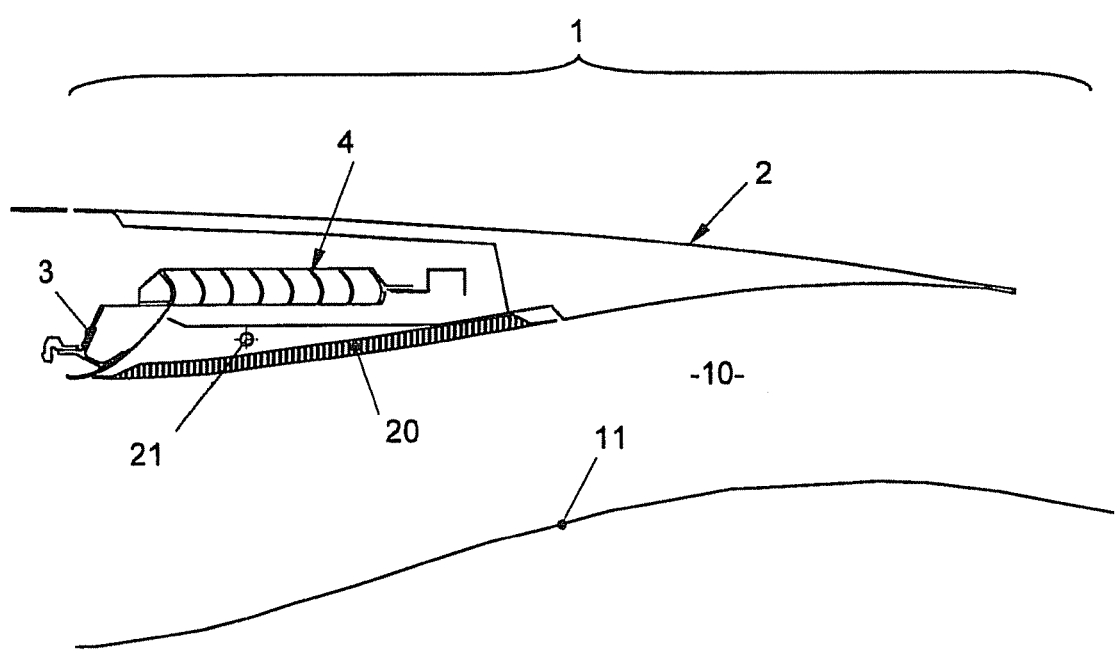
FIG. 1 is a partial schematic view, in longitudinal section on a plane passing through deflection grids, of a grid-type thrust reverser according to a first embodiment of the invention, in a closed position.
Figure 2:
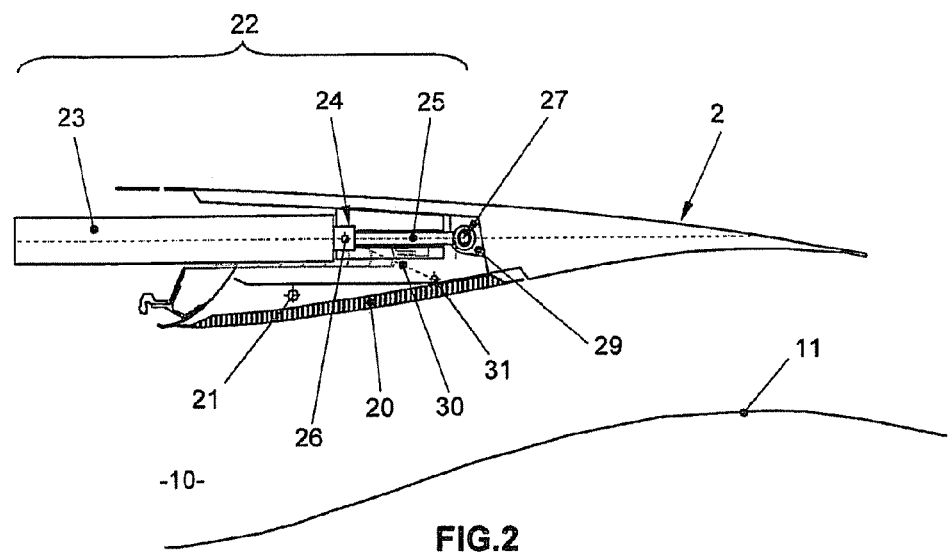
FIG. 2 is a partial schematic view, in longitudinal section on a plane passing through an actuating cylinder for the sliding cowl and for a reversal flap, of the thrust reverser in FIG. 1 during a phase in which the sliding cowl is shifted in the downstream direction (to uncover the grids)
Figure 3:
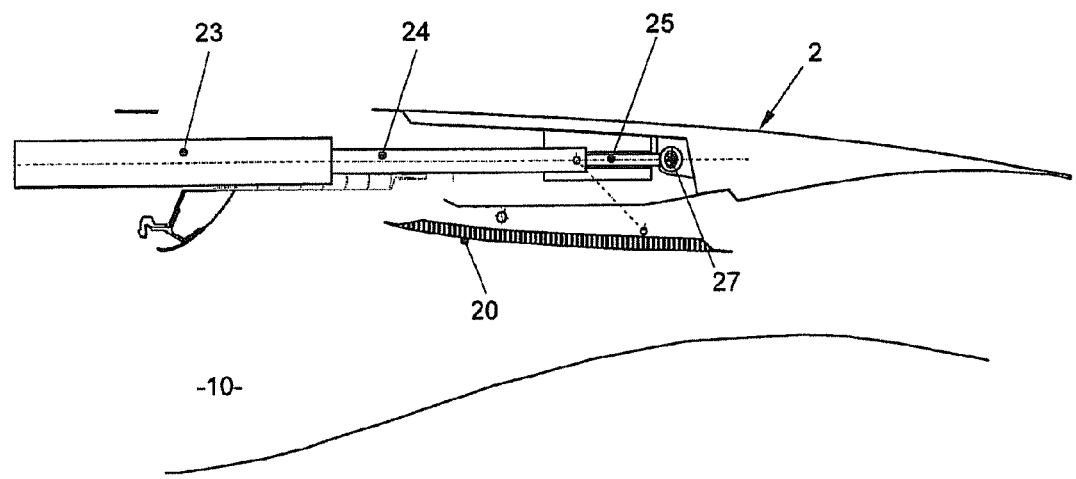
FIG. 3 is a similar view to FIG. 2 during a phase of deploying the flap to block off the annular flow duct.

In a manner known per se, the thrust reverser 1 shown in FIGS. 1 to 12 is associated with a turbofan (not shown) and comprises an external nacelle which, together with a concentric internal structure 11, defines an annular flow duct 10 for a secondary flow stream.

A longitudinally sliding cowl 2 is formed by two semicylindrical portions mounted on the nacelle so as to be able to slide along tracks (not shown).

An opening provided with fixed deflection grids 4 is formed in the external nacelle of the thrust reverser 1. In a situation with direct thrust of the gases, this opening is closed by the sliding cowl 2 and it is exposed, in a thrust reversal situation, by a longitudinal translational movement of the sliding cowl 2 in the downstream direction (with respect to the direction of flow of the gases).

A plurality of reversal flaps 20, distributed over the circumference of the cowl 2, are each pivotally mounted, by an upstream end about a hinge pin 21, to the sliding cowl 2 between a retracted position and a deployed position in which, in a thrust reversal situation, they block off the annular duct 10 in order to deflect a gas flow toward the opening provided with grids 4. A seal (not shown) is provided around the periphery of each flap 20 in order to isolate the flow circulating in the annular duct 10 from the flow outside the nacelle.

During the operation of the turbofan in direct thrust mode (see FIG. 1), the sliding cowl 2 forms all or part of a downstream portion of the nacelle, the flaps 20 then being retracted into the sliding cowl 2 which blocks off the opening provided with grids 4.

To reverse the thrust of the turbofan, the sliding cowl 2 is shifted into a downstream position and the flaps 20 pivot into a blocking position so as to deflect the secondary flow toward the grids 4 and to form a reversed flow guided by the grids 4.

As indicated in FIGS. 2 to 6, a slider 24 for driving a flap 20 (or two flaps 20 placed one on either side of the slider 24) is movably mounted in two lateral translation-guiding tracks 33 formed in a structure of the sliding cowl 2.

The driving slider 24 is connected to a downstream end of the flap 20 via a driving link 30 hinged on the flap about a pin 31 and on the slider 24 about a transverse pin 26, such that a translational movement of the slider 24 in its guide tracks 33 is accompanied by a pivoting of the link 30, and therefore of the flap 20.

The guide tracks 33 (see FIGS. 5 and 6) are arranged on either side of the driving slider 24, each receiving one end, provided with a runner or roller 32, of the transverse pin 26 for hinging the driving link or links 30 on an end of the driving slider 24.

Here, the driving slider forms an intermediate movable portion 24 of a "telescopic" actuating cylinder 22 arranged along a longitudinal axis of the reverser.

This actuating cylinder 22, which may be pneumatic, electric or hydraulic, comprises a tubular base 23 which is connected, either fixedly or swivelably, to the external nacelle upstream (at 3) of the reverser 1. The base 23 houses the driving slider 24 together with a terminal rod 25, both of which are mounted, independently of one another, in an axially sliding manner in the base 23 of the cylinder 22.

A downstream end of the terminal rod 25 is connected to the sliding cowl 2 via a transverse driving pin 27 housed in a cavity 28 of oblong shape perpendicularly to the direction of travel of the cowl 2, said cavity being made in a fitting 29 of the sliding cowl 2. This cavity 28 makes it possible to avoid an alignment of hyperstatic points between the base 23 of the cylinder 22, the pivoting pin 26 at the end of the movable portion 24, and the driving pin 27 at the end of the rod 25.

The cylinder 22 is controlled so as to translationally drive the slider 24 in its guide tracks 33 when the sliding cowl 2 is in a terminal phase of its translation travel in the downstream direction.

Specifically, it is important to be able to discharge the air captured by the turbofan inlet in an equal manner in direct thrust mode or reversed thrust mode, and more particularly in the course of the thrust reversal during which the reduction in the section of the duct 10 by the flaps 20 must be able to be compensated for by the increase in the section of the access offered upstream of the reverser by the deflection grids 4 when they are exposed by the retreating movement of the movable cowl 2.

Thus, in a first thrust reversal phase (see FIG. 2), the deployment of the rod 25 out of the cylinder 22 is initiated so as to shift the cowl 2 in the downstream direction, while the portion 24 remains retracted in the base 23 of the cylinder 22 and the flap or flaps 20 thus remain retracted in the sliding cowl 2.

When the sliding cowl 2 reaches a terminal phase of its translation travel in the downstream direction (see FIG. 3), the deployment of the intermediate portion 24 out of the base 23, delayed until now, is initiated and performed at a quicker rate than the deployment of the rod 25. The movement of the pin 26 in the tracks 33 is transmitted to the flap 20 via the link 30.

The deployment travel of the portion 24 can terminate after that of the rod 25 or at the same time. In a thrust reversal situation (see FIG. 4), the pins 26 and 27 have been brought together again downstream. Of course, the present invention is not limited to a particular actuating sequence of the portion 24 and the rod 25, their respective travels having to be produced in such a way that the upstream aerodynamic pressure is maintained substantially constant during the thrust reversal process.

During the return to direct thrust mode, the flap or flaps 20 can be totally or partially refracted before or during the movement of the movable cowl 2 in the upstream direction to re-cover the grids 4.

The lateral guide tracks 33 serve to take up force, thus avoiding any risk of the cylinder 22 buckling due to the aerodynamic pressure on the flaps 20.

In the variant embodiment illustrated in FIGS. 7 to 11, the means for actuating the sliding cowl 102 and the flap 120 are separate. The movement of the movable cowl 102 is controlled by a pneumatic, electric or hydraulic cylinder (not shown). Each semicylindrical portion of the cowl 102 comprises a track 133 (see FIG. 9) which extends lengthwise in a transverse plane and is intended for translationally guiding a driving slider 142.

Figure 7:
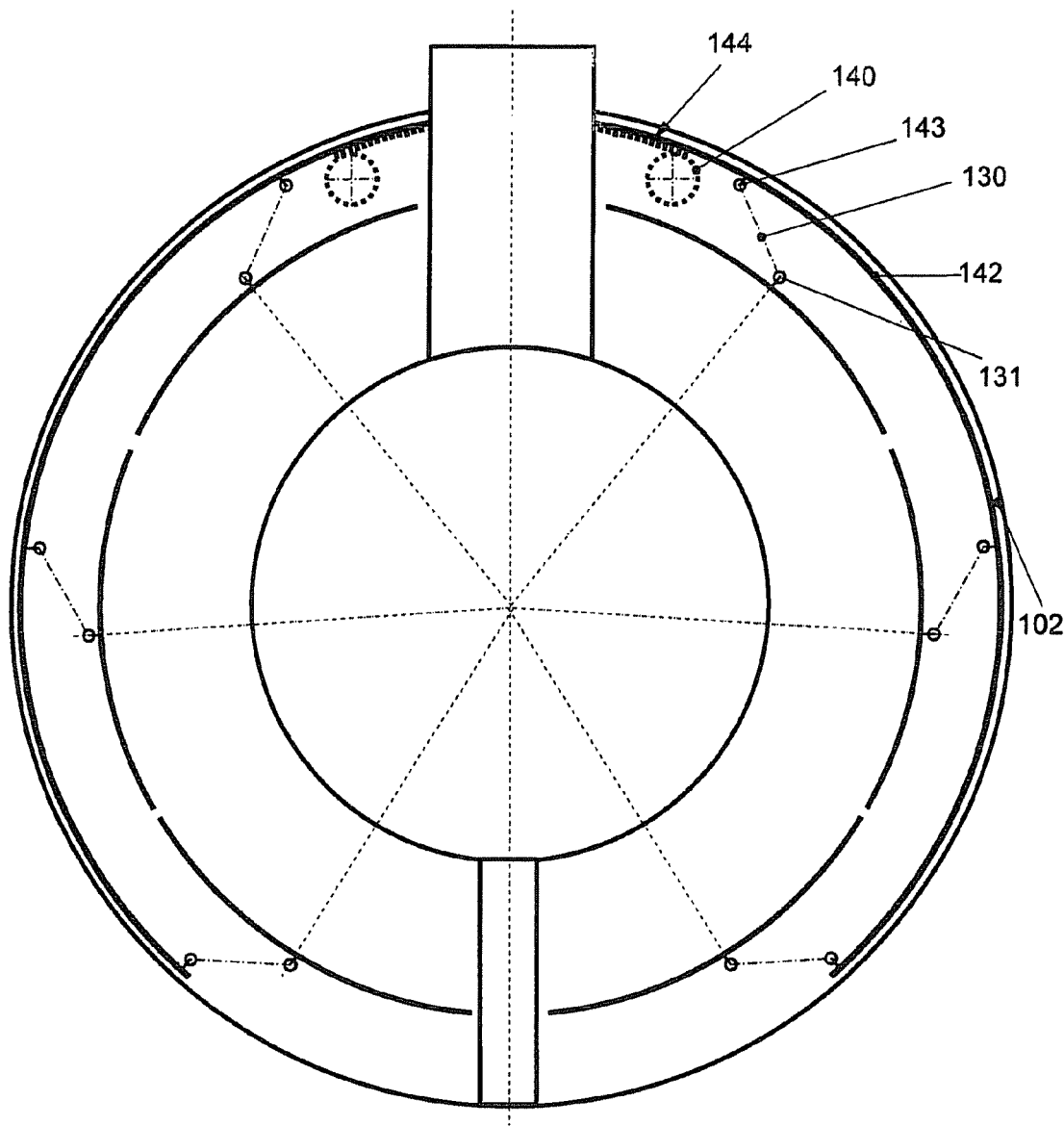
FIG. 7 is a schematic view in cross section of a thrust reverser according to a second embodiment of the invention, in a closed position.
Figure 8:
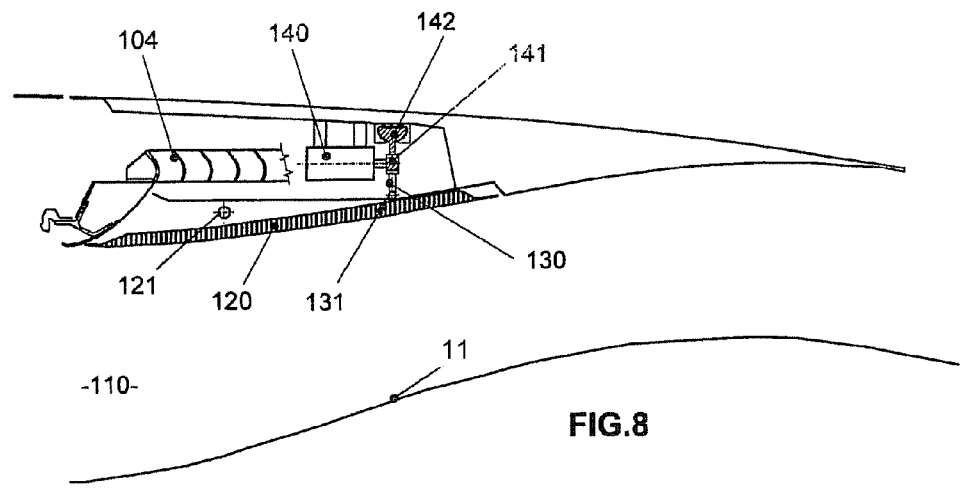
FIG. 8 is a partial schematic view in longitudinal section, similar to FIG. 1, of the thrust reverser in FIG. 7.
Figure 10:
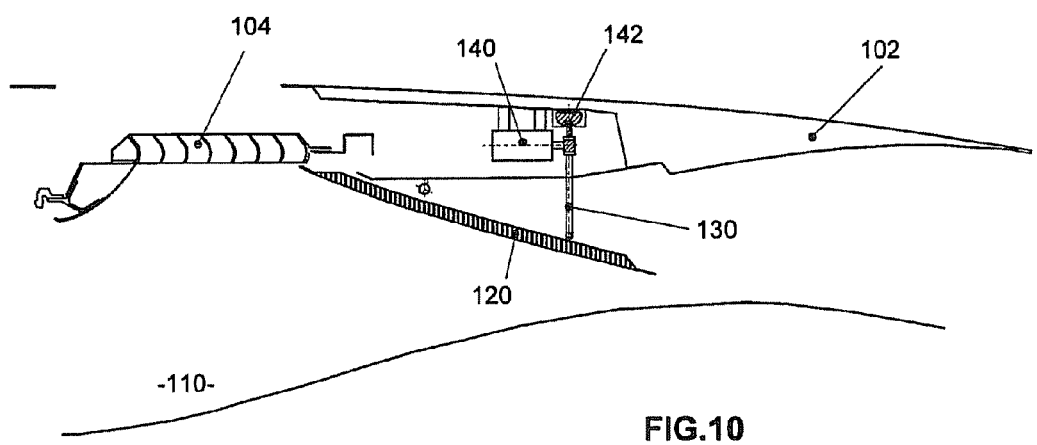
FIG. 10 is a similar view to FIG. 8 during a phase of deploying the flap to block off the annular flow duct.
Figure 9:
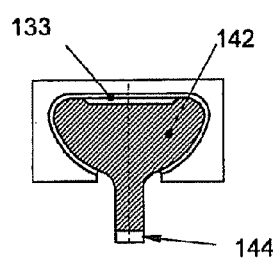
FIG. 9 is an enlarged view of a detail in FIG. 8.
Figure 11:
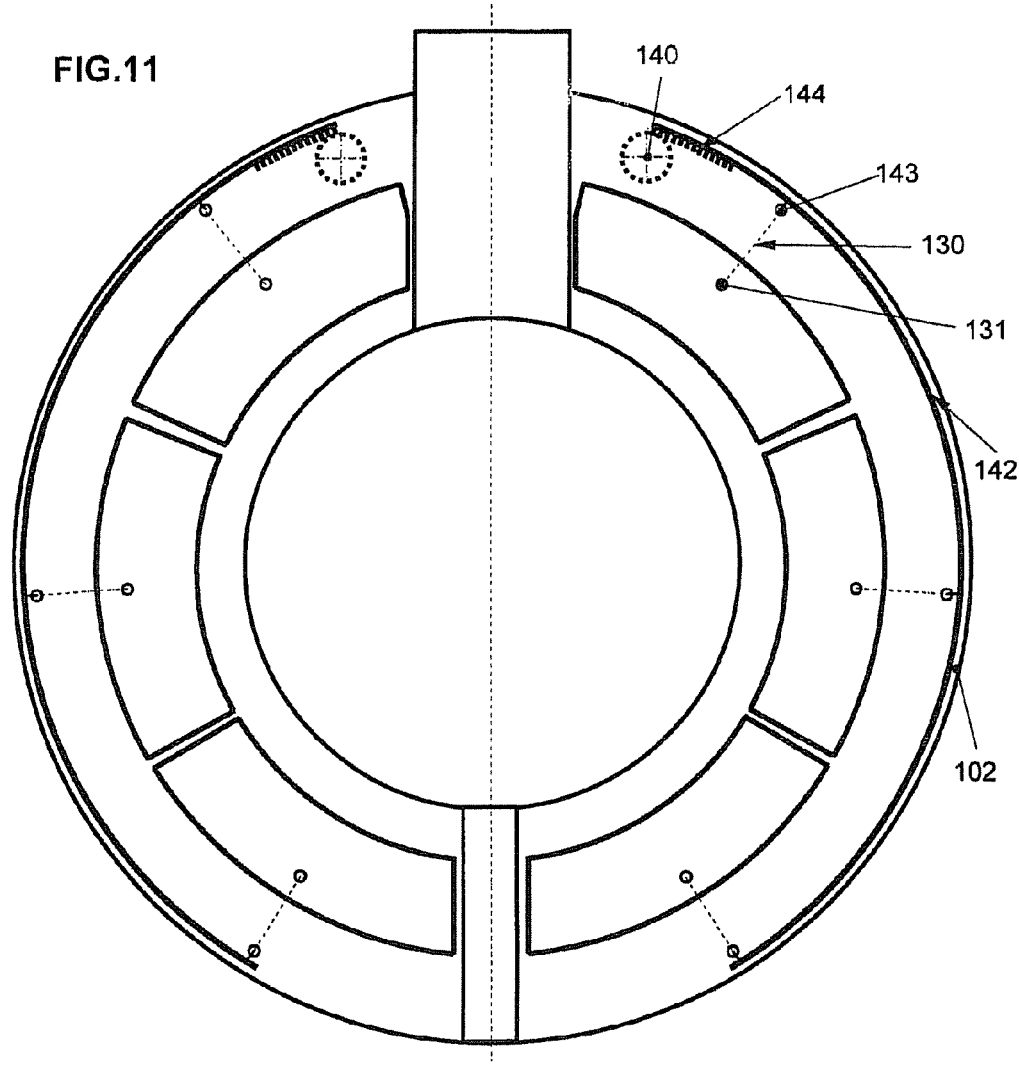
FIG. 11 is a similar view to FIG. 7 in a thrust reversal situation.

The track 133 forms a circular arc substantially concentric with the circumference of the sliding cowl 102 (see FIGS. 7 and 11). One and the same driving slider 142 is connected, via links 130 hinged about pins 131 and 143 parallel to the longitudinal axis of the reverser, to a plurality of reversal flaps 120 distributed over the circumference of each semicylindrical portion of the cowl 102.

The driving slider 142 has a length portion provided with a set of teeth 144 designed to engage with a pinion 141 which is driven to rotate, in a transverse plane of the sliding cowl 102, by an electric actuator 140. Thus, the movement of the slider 142 in its track 133 causes the driving links 130 and the flaps 120 to pivot toward the position in which they block off the annular duct 110.

One or more power supply connectors (not shown) are arranged in such a way as to energize the electric actuator 140 when the sliding cowl 102 reaches a terminal phase of its translation travel in the downstream direction.

The slider 142 can be held in a rest position (in direct thrust mode) by a dedicated locking mechanism or by the pinion 141 itself.

Figure 12:
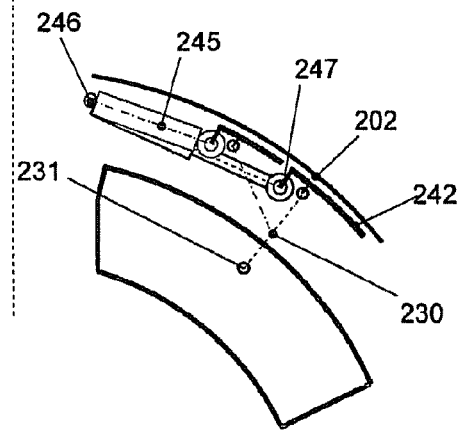
FIG. 12 is a schematic partial view in cross section of a thrust reverser according to a third embodiment of the invention.

FIG. 12 illustrates yet another variant embodiment which is similar to the preceding embodiment. Here, the driving slider 242 is moved in its track by an actuating cylinder 245, preferably an electric cylinder, which is arranged parallel to the guide track for the slider 242 and which is hinged by a first end (at 246) on a structure of the sliding cowl 202 and by a second end (at 247) on the driving slider 242.

Actuating the cylinder 245 in the terminal phase of the retreating travel of the sliding cowl 202 drives the slider 142 in its track and thus causes the link 230 and the flap 220 to pivot toward the position in which they block off the annular duct.

The invention makes it possible to easily modify the length of a driving link 30, 130 or 230 or the position of its hinge pin 31, 131 or 231 on the corresponding reversal flap in order to adjust the efficiency with which the annular duct is blocked off by the flap during the thrust reversal. It is also possible to have driving links 30, 130 or 230 of different lengths for the various flaps, with the aim of creating baffles to the flow passing around the flaps (it being possible for the flaps to have overlapping portions) in order to add, to the direct leakages, vortex effects which improve the drag at the outlet of the exhaust section.

Finally, since the deflection grids 4, 104 are fixed and placed upstream of the structure of the reverser, they are placed in an environment of solid aerodynamic lines. It is easy to manage the definition of the internal diameter of the grids 4, 104, particularly in order to reduce the length of movement of the sliding cowl 2, 102, 202, since the total exhaust section through the grids 4, 104 is a multiple of their length and the internal diameter. It will be understood that, for one and the same exhaust section, the larger the diameter the smaller the length of the grid.

As mentioned in the case where one and the same actuator 22 controls the movable cowl 2 and the flaps 20, it should be pointed out that the above-described embodiments in which the movable cowl 2 and the flaps 20 are equipped with separate actuators are likewise not limited to a particular actuating sequence of said actuators, these having to be controlled in such a way that the upstream aerodynamic pressure is maintained substantially constant during the thrust reversal process.

Although the invention has been described with specific exemplary embodiments, it is quite obvious that it is in no way limited thereto and that it comprises all the technical equivalents of the means described and combinations thereof if these come within the scope of the invention.

The invention claimed is:

1. A thrust reverser for a turbofan nacelle comprising:
    means for deflecting at least a fraction of an airflow of the turbofan toward an opening formed in an outer panel of the nacelle and at least one movable cowl which can move translationally in a substantially parallel direction to a longitudinal axis of the nacelle and which has at least one flap pivotably movable relative to a pivoting axis located on an upstream end of the flap, said movable cowl being able to switch alternately from a closed position in which the movable cowl covers the deflection means, to an open position in which the movable cowl opens a passage into the outer panel of the nacelle and uncovers the deflection means,
    wherein the movable cowl in the closed position provides aerodynamic continuity together with the flap being in a retracted position, the flap able to block off part of an annular duct of the nacelle in a pivoted position,
    wherein a slider for driving the flap is movably mounted in at least one translation-guiding track formed in a structure of the movable cowl, the slider connected to the flap via a driving link such that a translational movement of the slider in the translation-guiding track is accompanied by a pivoting of the link, and therefore of the flap, and actuating means are provided for translationally driving the slider in the translation-guiding track when the movable cowl is in a translation phase in a downstream direction.

2. The thrust reverser as claimed in claim 1, wherein the actuating means are provided for translationally driving the slider in the translation-guiding track when the movable cowl is in a terminal phase of its translational travel in the downstream direction.

3. The thrust reverser as claimed in claim 1, wherein the slider forms an intermediate movable portion of an actuating cylinder arranged along a longitudinal axis of the thrust reverser, said actuating cylinder comprising a tubular base connected to the external nacelle upstream of the reverser, the tubular base housing the slider and a terminal rod, wherein the slider and the terminal rod are mounted, independently one from the other, in an axially sliding manner in the base of the cylinder, a downstream end of the terminal rod being connected to the movable cowl.

4. The thrust reverser as claimed in claim 3, wherein the downstream end of the terminal rod of the actuating cylinder is connected to the movable cowl via a transverse driving pin housed in a cavity of oblong shape perpendicularly to a direction of travel of the cowl, said cavity being formed in a structure of the movable cowl.

5. The thrust reverser as claimed in claim 3, wherein there are two translation-guiding tracks for translationally guiding the slider, said translation-guiding tracks being arranged on each side of the slider, each of said translation-guiding tracks receiving one end of a transverse hinge pin for hinging a driving link on the slider.

6. The thrust reverser as claimed in claim 1, wherein the translation-guiding track for translationally guiding the slider extends lengthwise in a transverse plane of the movable cowl and forms a circular arc substantially concentric with a circumference of the movable cowl, and wherein said driving link is hinged on the flap and on the slider about pins which are substantially parallel to a longitudinal axis of the thrust reverser.

7. The thrust reverser as claimed in claim 6, wherein the slider is connected to a plurality of flaps distributed over the circumference of the movable cowl.

8. The thrust reverser as claimed in claim 6, wherein the slider has a length portion provided with a set of teeth intended to engage with a pinion driven to rotate, in a transverse plane of the movable cowl, by an actuator.

9. The thrust reverser as claimed in claim 8, wherein the actuator is electric and energized when the movable cowl reaches a terminal phase of its translational travel in the downstream direction.

10. The thrust reverser as claimed in claim 6, wherein the actuating cylinder for the slider, arranged parallel to the translation-guiding track for the slider, is hinged by a first end on a structure of the movable cowl and by a second end on the slider.

11. The thrust reverser as claimed in claim 1, wherein the movable cowl comprises a plurality of flaps distributed over its circumference and each flap comprising driving links of different lengths.

12. A turbofan nacelle, wherein the turbofan nacelle comprises at least one thrust reverser as claimed in claim 1.

* * * * *

UNITED STATES PATENT AND TRADEMARK OFFICE
CERTIFICATE OF CORRECTION

PATENT NO. : 8,677,732 B2  
APPLICATION NO. : 12/446704  
DATED : March 25, 2014  
INVENTOR(S) : Vauchel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1372 days.

Signed and Sealed this
Twenty-ninth Day of September, 2015

Michelle K. Lee
*Director of the United States Patent and Trademark Office*